3,004,969
3(SALICYLIDENEAMINO)COUMARINS AND THEIR PREPARATION
Janet N. Paige, St. Louis, Mich., assignor to The Dow Chemical Company, Midland, Mich., a corporation of Delaware
No Drawing. Filed Feb. 13, 1959, Ser. No. 792,992
4 Claims. (Cl. 260—240)

The present invention is directed to 3-salicylideneaminocoumarin and substituted 3-salicylideneaminocoumarins, corresponding to the formula

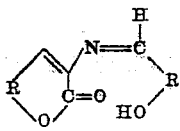

in this and succeeding formulas in the present specification and claims, R is an orthoarylene radical of the benzene series. The term "orthoarylene radical of the benzene series" is used to designate a bivalent radical selected from the group consisting of phenylene and substituted phenylene whereof the available valence bonds arise from adjacent carbon atoms. In those compounds in which the phenylene group is substituted, the substituents thereupon may comprise alkyl, phenalkyloxy, alkyloxy, haloalkyl, hydroxyalkyl, of which each alkyl group contains from one to four carbon atoms, alkenyl containing from one to four carbon atoms, halogen, nitro, amino, hydroxy, and phenoxy.

The present compounds are crystalline solids, soluble in many common organic solvents, such as the lower alkanols, liquid chlorinated hydrocarbons, and acetone, and of very low solubility in water, aliphatic hydrocarbon liquids, and aqueous alkali. They are useful as parasiticides and fungicides and are adapted to be employed for the control of virus diseases of plants.

The novel compounds may be prepared by contacting glycine and salicylaldehyde or a substituted salicylaldehyde corresponding to the formula

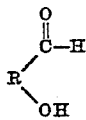

Good results are obtained when reacting approximately two molecular proportions of the salicylaldehyde reactant with each molecular proportion of glycine. Conveniently the reaction is carried out in a liquid reaction medium, which may advantageously be glacial acetic acid, or a butanol-methylene chloride mixture. The reaction takes place smoothly at temperatures in the range of 50°–100° C. with preparation of the 3-(salicylideneamino)coumarin compound and water of reaction.

In carrying out the reaction, the salicylaldehyde reactant and glycine are intimately mixed and blended together to prepare a reaction mixture. The combining of the reactants is preferably carried out dropwise and with stirring and heating at a temperature within the reaction temperature range. Heating and stirring are thereafter continued for a period of time to carry the reaction to completion. Thereafter, a major portion of the liquid reaction medium may be removed by fractional distillation to concentrate the desired product in the remaining proportion, in which it settles, and from which, by filtration, it may be removed.

The following example illustrates the invention, but is not to be considered as limiting it.

Example

Salicylaldehyde (122 grams; 1 mole), was added portionwise, and with stirring over a period of one hour, to 37.5 grams (0.5 mole) glycine dissolved in 700 milliliters acetic acid, which was heated at 73°. Upon completion of the addition, the resulting reaction mixture was heated at 73° C. and under reflux for 1 hour. Thereafter, the resulting mixture was fractionally distilled to remove 475 milliliters acetic acid, and the undistilled portion allowed to cool. An orange-red crystalline material separated from, and precipitated in, the reaction mixture and was removed therefrom by filtration, and air dried. As a result of these operations, there was obtained a 3-(salicylideneamino)coumarin product melting at 180–192° C. Further precipitate of the same product formed and was similarly removed on the 13th, 22nd, and 56th days following the date of the reaction.

In similar preparations, other products of the present invention are prepared as follows:

From 3-allylsalicylaldehyde and glycine, a 8-allyl-3-(3-allylsalicylideneamino)coumarin product.

From 4-aminosalicylaldehyde and glycine, a 7-amino-3-(4-aminosalicylideneamino)coumarin product.

From 4-benzyloxy-3,6-dimethoxy salicylaldehyde and glycine, a 7-benzyloxy-5,8-dimethoxy-3-(4-benzyloxy-3,6-dimethoxysalicylideneamino)coumarin product.

From 3,5-bis chloromethylsalicylaldehyde and glycine, a 6,8-bischloromethyl - 3-(3,5-bischloromethylsalicylideneamino)coumarin product.

From 3,5-bishydroxymethylsalicylaldehyde and glycine, a 6,8-bis hydroxymethyl-3-(3,5-bis hydroxymethylsalicylideneamino)coumarin product.

From 3-bromosalicylaldehyde and glycine an 8-bromo-3-(3-bromosalicylideneamino)coumarin product.

From 5-bromosalicylaldehyde and glycine a 6-bromo-3-(5-bromosalicylideneamino)coumarin product.

From 3-chlorosalicylaldehyde and glycine, an 8-chloro-3-(3-chlorosalicylideneamino)coumarin product.

From 5-chlorosalicylaldehyde and glycine a 6-chloro-3-(5-chlorosalicylideneamino)coumarin product.

From 5-chloro-3-fluorosalicylaldehyde and glycine a 6-chloro-8-fluoro-3 - (5-chloro-3 - fluorosalicylideneamino) coumarin product.

From 3,5-dibromosalicylaldehyde and glycine a 6,8-dibromo - 3-(3,5-dibromosalicylideneamino)coumarin product.

From 3,5-dichlorosalicylaldehyde and glycine a 6,8-dichloro - 3-(3,5-dichlorosalicylideneamino)coumarin product.

From 3,6-dimethylsalicylaldehyde and glycine, a 5,8-dimethyl - 3-(3,6 - dimethylsalicylideneamino)coumarin product.

From 3-ethoxysalicylaldehyde and glycine an 8-ethoxy-3-(3-ethoxysalicylideneamino)coumarin product.

From 3-fluorosalicylaldehyde and glycine an 8-fluoro-3-(3-fluorosalicylideneamino)coumarin product.

From 4-hydroxysalicylaldehyde and glycine, a 7-hydroxy - 3-(4-hydroxysalicylideneamino)coumarin product.

From 3 - methoxysalicylaldehyde and glycine, an 8-methoxy - 3-(3-methoxysalicylideneamino)coumarin product.

From 5-methyl salicylaldehyde and glycine, a 6-methyl-3 - (5-methylsalicylideneamino)coumarin product.

From 3-nitro salicylaldehyde and glycine an 8-nitro-3-(3-nitrosalicylideneamino)coumarin product.

From 4-nitrosalicylaldehyde and glycine, a 7-nitro-3-(4-nitrosalicylideneamino)coumarin product.

From 5-nitrosalicylaldehyde and glycine, a 6-nitro-3-(5-nitrosalicylideneamino)coumarin product.

From 6-nitrosalicylaldehyde and glycine, a 5-nitro-3-(6-nitrosalicylideneamino)coumarin product.

The present compounds are useful as fungicides and virucides, and are especially adapted to be employed in the control of fungous diseases of desired plants. For such use, the compounds may be dispersed upon an inert finely divided solid and the resulting preparation employed as a dust. Also, such preparations may be dispersed in water with or without a wetting agent and the resulting aqueous dispersions used as sprays. In other procedures the compounds may be employed in oil or as a constituent of oil-in-water or water-in-oil emulsions or as aqueous dispersions thereof which may be applied as spray, drench, or wash. In a representative operation, the application as a thorough wetting spray to young tomato plants of a composition containing 3-(salicylideneamino)coumarin at the rate of 4 ounces per 100 gallons of ultimate composition afforded very substantial protection against subsequent inoculation with viable spores of *Alternaria solani* whereas plants similarly inoculated with the fungus but without protection from the present compound were uniformly and heavily infested.

The substituted salicylaldehydes employed as starting materials in the preparation of the compounds of the present invention may be produced in known procedures. As one example, the Reimer-Tiemann reaction may be employed, wherein a phenol or substituted phenol is treated with chloroform and alkali in alcoholic solution, the resulting mixture acidified and distilled, as, for example, at subatmospheric pressure, to separate and purify the desired product.

Various modifications of the process and products of the present invention may be made without departing from the spirit or scope thereof, and it is to be understood that I limit myself only as defined in the appended claims.

I claim:
1. The salicylidene-3-amino coumarins corresponding to the formula wherein each R represents a member of the group consisting of orthophenylene and substituted orthophenylene, in which the substituents are selected from the group consisting of halogen, amino, nitro, hydroxy, phenoxy, alkyl, phenalkyloxy, alkyloxy, haloalkyl, hydroxyalkyl, and alkenyl of from 1 to 4, inclusive, carbon atoms; said alkyl moieties being of from 1 to 4, inclusive, carbon atoms.

2. 3-(salicylideneamino)coumarin.

3. The method of preparing salicylidene-3-amino coumarins corresponding to the formula which comprises the steps of contacting at temperatures of from 50° to 100° C., glycine and the salicylaldehyde corresponding to the formula wherein each R represents a member of the group consisting of orthophenylene and substituted orthophenylene in which the substituents are selected from the group consisting of halogen, amino, nitro, hydroxy, phenoxy, alkyl, phenalkyloxy, alkyloxy, haloalkyl, hydroxyalkyl, and alkenyl of from 1 to 4, inclusive carbon atoms; said alkyl moieties being of from 1 to 4, inclusive, carbon atoms.

4. A method of preparing the compound 3-salicylideneaminocoumarin which comprises the steps of contacting, at a temperature in the range of from 50° to 100° C., glycine and salicylaldehyde, and thereafter separating 3-salicylideneaminocoumarin.

No references cited.